Figure 4:
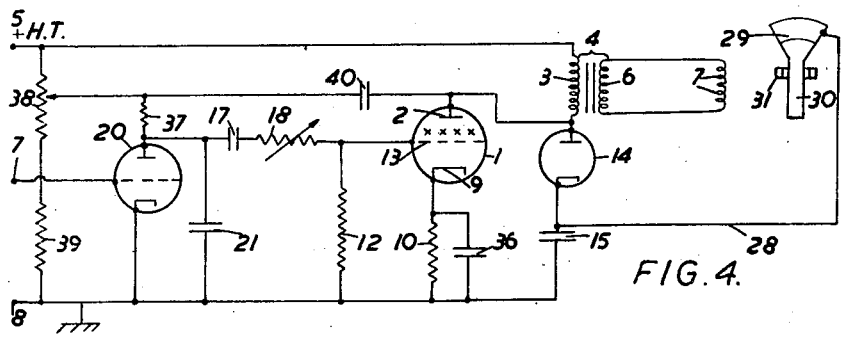

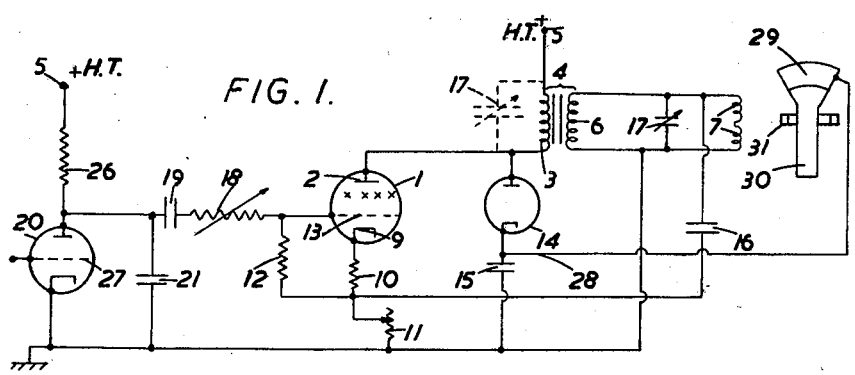
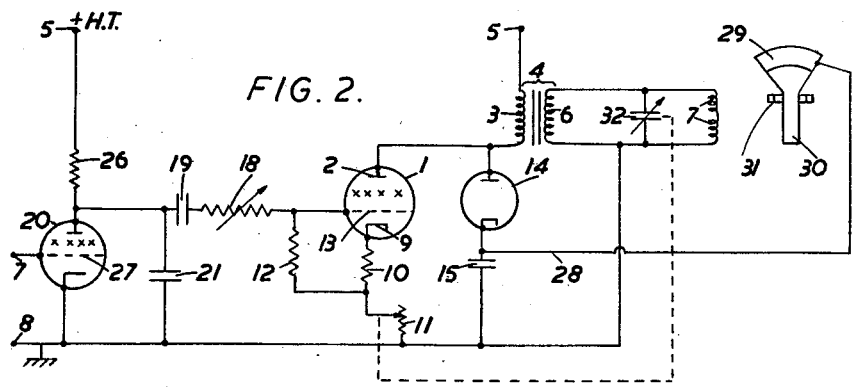
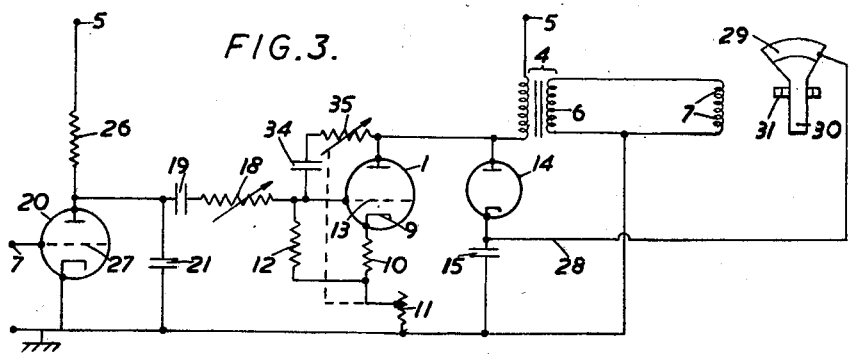
Inventor
CHARLES LESLIE FAUDELL
By
J. O. Ollier
Attorney Inventor
CHARLES LESLIE FAUDELL
By
J. O. Ollier
Attorney Inventor
CHARLES LESLIE FAUDELL
By J. O. Ollier
Attorney Patented Dec. 9, 1952

2,621,309

UNITED STATES PATENT OFFICE 2,621,309

CIRCUITS FOR PRODUCING SAW TOOTH CURRENTS

Charles Leslie Faudell, near Stoke Poges, England, assignor to Electric & Musical Industries Limited, Hayes, Middlesex, England, a company of Great Britain Application April 6, 1949, Serial No. 85,740
In Great Britain April 9, 1948

17 Claims. (Cl. 315—27)

This invention relates to circuits for producing a sawtooth current in an inductance of the type wherein means are provided for rectifying the voltage pulses produced across said inductance due to the change of current during the short flanks of the sawtooth current waveform. Such circuits may be employed for example for deflecting the beam of a cathode ray tube, for example in television transmitting or receiving apparatus, the above-mentioned inductance being constituted by scanning coils of the tube, and in such cases the relatively high steady voltage which is required to be applied to the final anode of the tube may be derived at least in part from the voltage pulses rectified as above-mentioned.

The object of the invention is to provide an improved circuit of this type.

According to the invention there is provided a circuit for producing a sawtooth current in an inductance, wherein means are provided for rectifying the voltage pulses developed across said inductance during the short flanks of the sawtooth current waveform to provide a source of voltage, and comprising means for controlling the rate of change of current in said inductance during said short flanks whereby to control said voltage.

In one form of the invention means are provided for adjusting the resonant frequency of the circuit in which said inductance is included. Said means may for example comprise a variable capacitor connected in shunt with said inductance or in shunt with a winding of a coupling transformer via which the sawtooth current is fed to said inductance. By adjustment of said variable capacitor, the rate of change of the current in said inductance during the short flanks of the sawtooth is varied, and since the amplitude of the voltage pulses is a function of said time the steady voltage derived from said pulses is also varied. When for example said steady voltage is applied to the final anode of a cathode ray tube the final anode voltage of said tube can in this way be adjusted without thereby substantially affecting the amplitude of the sawtooth deflecting current.

In another form of the invention means are provided whereby the resonant frequency of the circuit in which said inductance is included is varied automatically as the amplitude of the sawtooth current is varied, whereby to maintain the amplitude of said voltage pulses substantially constant. Where the circuit is employed to provide deflecting current and a final anode voltage for a cathode ray tube the amplitude of the sawtooth current can in this way be adjusted, so as to vary the magnitude of the beam deflections without thereby substantially affecting the final anode voltage.

In another form of the invention means may be provided for damping the circuit including said inductance to a degree dependent on the amplitude of the sawtooth current, whereby the rate of change of current in said coils during the short flank of the sawtooth current is varied so that the amplitude of said voltage pulses is substantially unaffected by adjustment of the amplitude of said sawtooth current.

According to the invention also there is provided cathode ray tube apparatus comprising a cathode ray tube provided with a permanent magnet electron lens which assists in focussing the beam, means for developing a sawtooth current in the scanning coils of said tube, means for rectifying the voltage pulses produced in said coils during the fly-back strokes, means for applying the rectified voltage to the final anode of the tube to assist in focussing the beam, and means for varying said rectified voltage to adjust focussing of the beam without thereby substantially affecting the amplitude of said sawtooth current.

In order that the said invention may be clearly understood and readily carried into effect, the same will now be more fully described with reference to the accompanying drawings, which, in Figures 1 to 9, illustrate various circuit arrangements according to the invention for providing beam deflecting current and final anode voltage for a cathode ray tube.

In the various figures parts having the same functions have been given the same reference numerals.

Referring to Figure 1, the circuit shown includes an electron discharge tube 1, the anode 2 of which is connected via the primary winding 3 of a transformer 4 to the positive terminal 5 of an H. T. voltage source (not shown). The secondary winding 6 of transformer 4 is connected to the scanning coils 7 of a cathode ray tube 30. The cathode 9 of tube 1 is connected via cathode resistor 10 to an adjustable tapping on a resistor 11 one end of which is connected to ground. A grid resistor 12 is connected between said tapping and the control electrode 13 of tube 1. A diode rectifier 14 has its anode connected to anode 2 of tube 1 and its cathode connected to one electrode of a capacitor 15, the other electrode of which is connected to ground. A capacitor 16 is connected between the high potential side of coils 7 and the tapping on resistor 11. In shunt with secondary winding 6, i.e. with the scanning coils 7 is provided a variable capacitor 17. The control electrode 13 of tube 1 is connected via a variable resistor 18 and a capacitor 19 to the anode of an electron discharge tube 20. The anode of tube 20 is connected to positive H. T. terminal 5 via a resistor 26 and the cathode is connected to ground. A capacitor 21 is connected between the anode of tube 20 and ground.

In operation, tube 20 is normally non-conducting but is periodically rendered conducting by positive voltage pulses applied to its control electrode 27. Capacitor 21 is charged via resistor 26 in the intervals between said pulses, and upon the occurrence of each pulse capacitor 21 is discharged via tube 20, whereby a voltage of sawtooth waveform is developed across capacitor 21 and is applied via capacitor 19 and resistor 18 to the control electrode 13 of tube 1. This results in a voltage pulse being periodically developed across the primary winding of transformer 4, whereby the current in the scanning coils 7 increases relatively slowly in a substantially linear manner. Capacitors 16 and 17 are ineffective during this increase of current. Upon the occurrence of each short flank of the sawtooth voltage, i. e. upon the cessation of each voltage pulse across the primary winding of transformer 4 the current in the scanning coils 7 reverses relatively rapidly. The current in said coils thus has a sawtooth waveform the long flanks of which correspond to forward strokes of the electron beam and the short flanks of which correspond to fly-back strokes. During the rapid fall and reversal of the current in the scanning coils, there is generated across the scanning coils 7 a voltage pulse the amplitude of which depends on the amplitude of the deflecting current and on the rate of change of the current during the fly-back stroke. Since the amplitude of this voltage pulse depends on the rate of change of current, that is to say on the time during which the current falls and reverses, the amplitude of said voltage pulse likewise depends on the resonant frequency of the scanning coil circuit and this frequency is determined partly by capacitor 16. The voltage pulses in primary winding 3 are rectified by diode 14, and the rectified pulses are fed to capacitor 15, whereby a substantially steady voltage is produced across capacitor 15. Said steady voltage is applied via conductor 28 to the final anode 29 of the cathode ray tube 30, and serves in conjunction with a permanent magnet lens 31 to focus the electron beam.

In order to vary the amplitude of the deflecting current in coils 7, the tapping on resistor 11 is adjusted, whereby the gain of tube 1 is altered. If the resonant frequency of the scanning coil circuit remains unaltered, variation in the amplitude of the deflecting current will result in variation in the amplitude of the voltage pulses occurring during fly-back, and therefore of the voltage pulses rectified by diode 14. This means that the steady voltage across capacitor 15 will also vary, thereby disturbing the focussing of the beam of the cathode ray tube 30. However, since capacitor 16 is connected between coils 7 and the tapping point on resistor 11, as said tapping point is adjusted the effective value of resistor 11 in series with capacitor 16 is varied, whereby the effect of capacitor 16 as regards the resonant frequency of the scanning coil circuit is automatically varied in such sense that the amplitude of the rectified voltage pulses, and the magnitude of the voltage across capacitor 15, is substantially unaltered by the change in the amplitude of the deflecting current. The focussing of the electron beam is thereby substantially unaffected by variation of the amplitude of the deflecting current fed to the scanning coils. The variable capacitor 17 in shunt with the scanning coils provides a means for varying the resonant frequency of the scanning coil circuit and hence the rate of change of current in the scanning coils during flyback independently of the means for varying the amplitude of the deflecting current, so that the steady voltage may be independently varied. A simple means of varying the focussing of the beam of cathode ray tube 30 is thereby provided. Capacitor 17 may if preferred be connected in shunt with the primary winding 3 of transformer 4, as indicated in dotted lines. An alternative means for varying the focussing of the beam is afforded by variable resistor 18. This variable resistor, in conjunction with the capacity of the input electrodes of tube 1, provides a network of variable time constant, and adjustment of resistor 18 produces a variation in the final anode voltage by varying the rate of change, during fly-back, of the sawtooth voltage applied to tube 1, thereby varying the rate of cut-off of the tube 1 and hence the rate of change of current in the coils 7 during flyback. Resistor 18 is ineffective during the long flanks of the sawtooth current. Although capacitor 17 and resistor 18 are both shown in Figure 1, they would not be simultaneously required in practice.

Figure 2 shows a modification of the circuit of Figure 1 in which capacitor 16 is omitted, and a variable capacitor 32 having a suitable law is connected in shunt with the scanning coils 7, capacitor 32 being mechanically connected with the knob or like control member by which the tapping on resistor 11 is adjusted. During the long flanks of the sawtooth current capacitor 32 is ineffective, but during the short flanks it becomes effective to control the resonant frequency of the coil circuit. As the gain of tube 1 is varied to vary the amplitude of the deflecting current fed to the scanning coils the effective value of capacitor 32 is simultaneously varied so as to vary the resonant frequency of the scanning coil circuit in such manner as to maintain substantially constant the amplitude of the voltage pulses set up during fly-back. Focussing of the beam is effected by means of resistor 18 as above described.

Figure 3 shows a further modification in which capacitor 16 is omitted and in which a capacitor 34 is connected in series with a variable resistor 35 between the anode and control electrode of tube 1. By adjustment of resistor 35 the degree of negative feedback at high frequencies i. e. during the fly-back is adjusted, thereby varying the rate of change of the current in the scanning coils during the fly-back period. In this way, the final anode voltage may be adjusted independently of the amplitude of the deflecting current. In this case resistor 18 may be omitted. If desired resistor 18 may be retained and resistor 35 may be coupled with resistor 11 so that as resistor 11 is adjusted to vary the amplitude of the deflecting current, the simultaneous variation of resistor 35 serves to alter the degree of negative feedback whereby to maintain the final anode voltage substantially unaltered, so that focussing is not disturbed. Resistors 18 and 35 are ineffective during the long flanks of the sawtooth current.

Referring now to Figure 4, which illustrates a further embodiment of the invention, a cathode resistor 10 and grid resistor 12 are connected directly to ground, resistor 10 having a by-pass capacitor 36. As in the circuit of Figures 1 to 3 a voltage of sawtooth waveform is arranged to be applied to the control electrode 13 of tube 1, so that current of sawtooth waveform is produced in scanning coils 7. The anode of tube 20 is connected via a resistor 37 to a tapping on a potentiometer formed by resistors 38 and 39 connected in series between positive H. T. terminal 5 and ground. In order to vary the amplitude of the sawtooth current fed to deflecting coils 7, the amplitude of the sawtooth voltage applied to the control electrode 13 of tube 1 is varied by adjusting the tapping on resistor 38. In order that the final anode voltage may not be affected by such adjustment, a capacitor 40, which is ineffective during the long flanks of the sawtooth current, is connected between the tapping on resistor 38 and the junction of primary winding 3 with the anode of diode 14, so that as said tapping is adjusted the effectiveness of capacitor 40 as regards determining the resonant frequency of the scanning coil circuit is varied automatically in such sense as to maintain the amplitude of the voltage pulses across primary winding 3 during fly-back substantially unaltered upon a change in the amplitude of the deflecting current. The final anode voltage is adjustable independently by means of the variable resistor 18.

Figure 5:
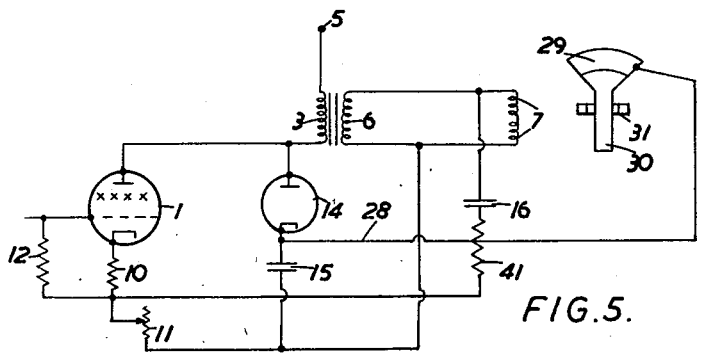

Figure 5 shows part of a circuit in which means are provided for damping the scanning coil circuit, the damping being controlled in accordance with the amplitude of the deflecting current in the scanning coils. In this case capacitor 16 is made very much larger than would be required in an arrangement as shown in Figure 1, and there is provided in series with capacitor 16 a resistor 41 of such value that the combination of capacitor 16 and resistor 41 is such that there is little damping of the scanning coil circuit when variable resistor 11 is adjusted to provide maximum resistance. Upon a reduction of the effective value of resistor 11 to increase the amplitude of the deflecting current, increased damping is imposed on the scanning coil circuit, thereby preventing the amplitude of the voltage pulses during fly-back from increasing substantially, whereby the final anode voltage, i. e. the steady voltage across capacitor 15, remains substantially unaltered. The final anode voltage can be independently adjusted by means of the variable resistor 18.

Figure 6:
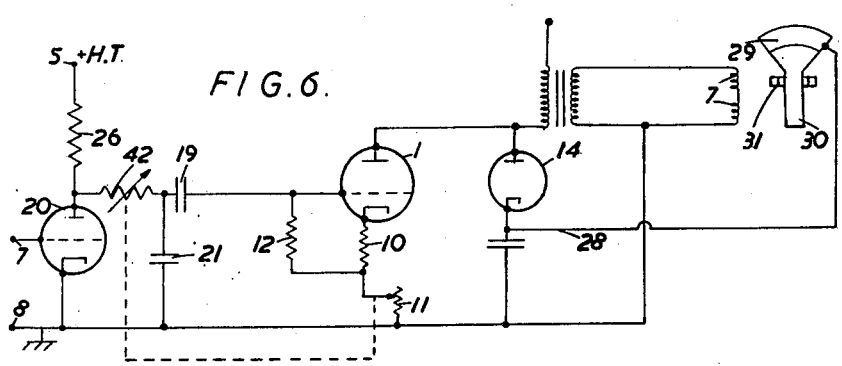

Figure 6 shows another circuit in which means are provided for controlling the rate of change of current in the scanning coils during the short flanks of the sawtooth voltage applied to the electron discharge tube 1 which supplies the sawtooth current to the deflecting coils. Normally said short flanks serve to reduce the current in said tube rapidly to cut-off so that the deflecting current in the coils can reverse at a rapid rate unimpeded by current from said tube, which would tend to retard the reversal of the deflecting current. Said means comprises the variable resistor 42 which is connected between the anode of tube 20 and the junction of capacitors 19 and 21, resistor 42 being coupled with the control member by which resistor 11 is adjusted so that as the effective value of resistor 11 is varied to vary the gain of tube 1, the effective value of resistor 42 is also varied, whereby to vary suitably the rate of discharge of capacitor 21 in such sense that the amplitude of the voltage pulses developed in the scanning coils during the short flank of the sawtooth current is substantially unaffected by adjustment of the amplitude of the sawtooth current. The resistor 42 is substantially ineffective during the long flanks of the sawtooth current.

Figure 7:
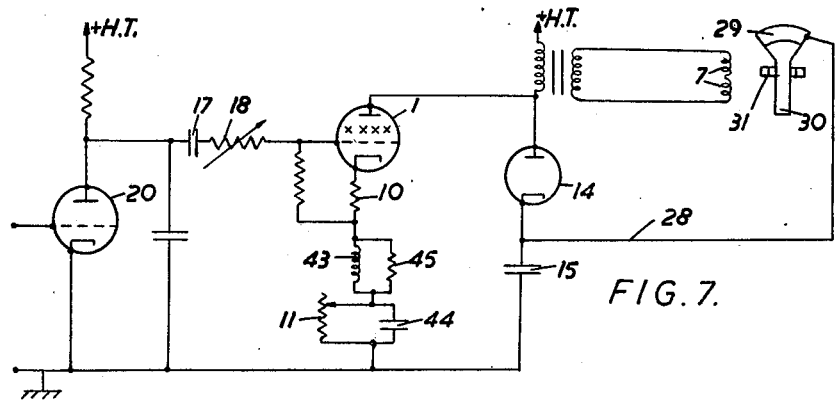

In the arrangement of Figure 7, an inductive impedance 43 is inserted between resistor 10 and the variable resistor 11. The value of impedance 43 is such that when the effective value of resistor 11 is zero, there is substantial degeneration of the higher frequency components, in the short flank of the sawtooth voltage generated by tube 20. Resistor 11 has a shunt capacitative impedance 44 such that when the effective value of resistor 11 is a maximum there is substantially no degeneration of the short flank of the sawtooth voltage but maximum degeneration of the long flank. Thus by suitable choice of the values of impedances 43 and 44 the rate of change of input voltage fed to tube 1 during the short flank may be made to vary inversely with the amplitude of the sawtooth voltage, thereby varying the degree of damping imposed by the internal impedance of tube 1, which in turn will be proportional to the amplitude of the deflecting current fed to the scanning coils. Impedance 43 has a shunt resistor 45 which serves to prevent unwanted resonances. Variable resistor 18 enables the final anode voltage to be independently adjusted.

Figure 8:
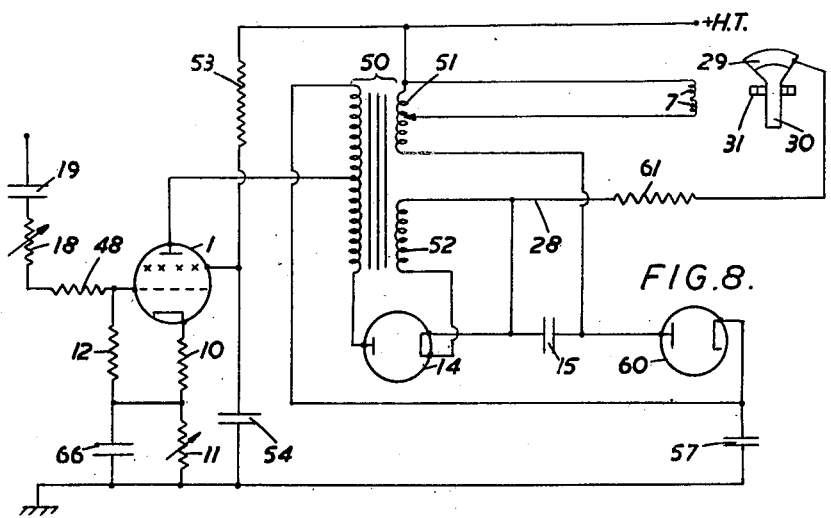

Referring to Figure 8, which illustrates a further embodiment of the invention, a sawtooth voltage, which may be generated as above-described, is applied via condenser 19, variable resistor 18, and fixed grid resistor 48, to the control electrode of electron discharge amplifying tube 1. The anode of tube 1 is connected to a tapping on the primary winding of a transformer 50 which is provided with two secondary windings 51 and 52. The screen electrode of tube 1 is connected to the positive H. T. terminal 5 via a voltage dropping resistor 53 and to ground via decoupling capacitor 54. The output of tube 1 comprises a current of sawtooth waveform, which is fed via transformer 50 to line scanning coils 7, the ends of said coils being connected respectively to one end of secondary winding 51 and to a tapping on said secondary winding.

One end of the primary winding of transformer 50 is connected to ground via a capacitor 57 and the other end of said primary winding is connected to the anode of diode 14 the cathode of which is connected via a capacitor 15 to the anode of a diode 60, the cathode of which is also connected to ground via capacitor 57. One end of secondary winding 51 is connected to the H. T. terminal 5 and the other end of winding 51 is connected to the anode of diode 60. The ends of secondary winding 52 are connected to the terminals of the filament of diode 14 to supply heating current thereto and one end of the winding 52 is connected via conductor 28, which includes a resistor 61, to the anode 29 of the cathode ray tube 30.

The operation of the circuit is as follows:
The positive potential for the anode of tube 1 is derived from H. T. terminal 5 via the winding 51 of transformer 50, diode 60 and the primary winding of transformer 50, and is augmented by the voltage set up across capacitor 57 by means of diode 60 which rectifies the voltage appearing across the whole of the secondary winding 52 of transformer 50. The high voltage pulses which are set up across the ends of the primary winding of transformer 50 during the short flanks of the sawtooth current fed to coils 7 are fed to diode 14 and are thereby rectified and applied to one electrode of condenser 15. The other electrode of condenser 15 being connected to secondary winding 51, diode 14 also rectifies the pulses, of smaller magnitude, which appear across secondary winding 51, and accordingly, the total voltage across capacitor 15 depends on the sum of the pulses applied to its two electrodes. This relatively high voltage, smoothed by capacitor 15, is fed via resistor 61 to the anode of the cathode ray tube.

The diode 60 serves to damp the voltage pulse produced in the scanning coil circuit at the end of the short flank of the sawtooth current and also to improve the linearity of the long flank, since it conducts during the whole or a great part of the duration of said long flank.

The resistor 61 serves to isolate the capacity of the cathode ray tube electrodes from the secondary winding 52 and in conjunction with the stray capacity of the cathode ray tube acts as a filter which serves to improve smoothing of the line scanning pulses, and to reduce or prevent radiation of line pulse harmonics from the conductor 28.

The amplitude of the sawtooth current fed to the scanning coils is controlled by negative feedback via a variable resistor 11 connected, in series with fixed bias resistor 10, between the cathode of tube 1 and ground. The control electrode of tube 1 is connected to ground via fixed resistor 12 and a capacitor 66, the ends of resistors 10 and 12 remote from the cathode and control electrode respectively being connected together. Capacitor 66 is chosen so that there is no appreciable degeneration of the higher frequencies during the short flanks of the sawtooth input voltage fed to tube 1, so that when the effective value of resistor 11 is increased the amplitude of the sawtooth current in tube 1 is reduced but the effective rate of change of current in coils 7 during the short flanks of the sawtooth current is increased. Thus the tendency for a reduction in the amplitude of the sawtooth current to lead to reduction in the anode voltage of the cathode ray tube is at least partly compensated by the tendency for the anode voltage to increase due to a more rapid rate of change of current during said short flanks.

Variable resistor 18 serves as the focussing control for the electron beam. Focussing of the beam is effected by variation of the anode voltage of the cathode ray tube in conjunction with the constant value of the field produced by a permanent magnet electron lens 31. Adjustment of resistor 18 produces a variation in said anode voltage by varying the rate of change of voltage during the short flanks of the sawtooth voltage applied to tube 1, variable resistor 18 in conjunction with the capacity of the input electrodes of tube 1 providing a network of variable time constant which controls the rate of cut-off of the tube 1.

The ratio of resistors 18 and 12 is important in that it controls the tendency for the picture width to vary with variation in the anode voltage of the cathode ray tube (due to variations in the velocity of the beam). For example an increase in the value of resistor 18 reduces the rate of change of the sawtooth voltage during the short flanks thereof and therefore also reduces the anode voltage of the cathode ray tube. Under these circumstances the picture width tends to increase but this tendency is opposed by the reduction in the input voltage of tube 1 in accordance with the ratio of resistors 18 and 12.

Figure 9:
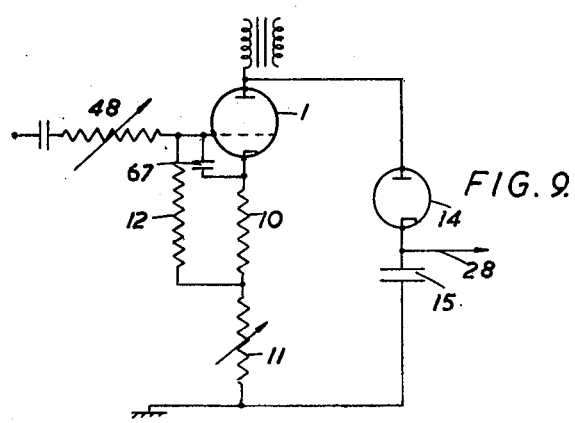

The circuit of Figure 9 shows part of an arrangement which is similar to that of Figure 8, except that capacitor 66 is omitted, and instead a capacitor 67 is connected between the cathode and control electrode of tube 1. Said capacitor 67 serves, in conjunction with variable resistor 48, to provide a circuit of variable time constant which determines the effective input time constant of tube 1. By adjusting resistor 48, the final anode voltage can be adjusted. Cathode resistors 10 and 11 provide a negative feedback path which determines the effective capacity of the input circuit, including capacitor 67, of tube 1. By varying resistor 11, the gain of tube 1 is varied, so varying the amplitude of the sawtooth current applied to the scanning coils. At the same time, however, the variation in the effective capacity of the input circuit of tube 1 causes the rate of variation in the voltage at the control electrode of tube 1 during the fly-back periods to be altered in such sense that the amplitude of the voltage pulses rectified by diode 14 remains substantially constant so that the focussing of the electron beam is substantially unaffected by variations in the amplitude of the scanning current. In some cases, if the input capacity of tube 1 is sufficient, capacitor 67 may be omitted.

What I claim is:

1. A circuit arrangement comprising an inductance, means for setting up a sawtooth current in said inductance, a rectifier connected to rectify voltage pulses set up across said inductance during the short flanks of said sawtooth current to produce a unidirectional voltage, an element associated with said inductance substantially ineffective during the long flanks of said sawtooth current but effective during said short flanks to control the rate of change of current in said inductance, said element being connected and proportioned to control the resonant frequency of the circuit in which said inductance is included, and means for effectively varying the value of said element to produce a desired rate of change of current in said inductance during the short flanks, whereby a desired value of said unidirectional voltage is produced.

2. A circuit arrangement according to claim 1, said element including a condenser coupled to said inductance.

3. A circuit arrangement according to claim 1, said means for setting up said sawtooth current including an electron discharge tube with its output circuit coupled to said inductance, and means for periodically cutting off the flow of current in said tube, whereby said element serves to control the rate of cut-off of said current.

4. A circuit arrangement according to claim 3, including a time constant network in the input circuit of said tube, said network including said element in the form of a variable resistor.

5. A circuit arrangement according to claim 1, including an electron discharge tube for feeding said sawtooth current to said inductance, and a negative feedback path for said tube, said element being connected to control the degree of negative feedback.

6. A circuit arrangement comprising an inductance, means for setting up a sawtooth current in said inductance, a rectifier connected to rectify voltage pulses set up across said inductance during the short flanks of said sawtooth current to produce a unidirectional voltage, an element associated with said inductance substantially ineffective during the long flanks of said sawtooth current but effective during said short flanks to control the rate of change of current in said inductance, means for effectively varying the value of said element to vary said unidirectional voltage, means for controlling the amplitude of said sawtooth current, and means responsive to adjustment of said controlling means for simultaneously adjusting the effective value of said element to maintain said unidirectional voltage substantially constant.

7. A circuit arrangement according to claim 6, said element being connected and proportioned to control the resonant frequency of the circuit in which said inductance is included.

8. A circuit arrangement according to claim 7, said element being in the form of a condenser coupled to said inductance.

9. A circuit arrangement comprising an inductance, means for setting up a sawtooth current in said inductance, a rectifier connected to rectify voltage pulses set up across said inductance during the short flanks of said sawtooth current to produce a unidirectional voltage, an element associated with said inductance substantially ineffective during the long flanks of said sawtooth current but effective during said short flanks to control the rate of change of current in said inductance, means for effectively varying the value of said element to produce a desired rate of change of current in said inductance during the short flanks, whereby a desired value of said unidirectional voltage is produced, means for controlling the amplitude of said sawtooth current, means responsive to adjustment of said controlling means for simultaneously adjusting the effective value of said element to maintain said rate of change of current and said unidirectional voltage substantially constant, an electron discharge tube for feeding said sawtooth current to said inductance, a negative feedback path connected to said tube to control said unidirectional voltage, said feedback path including said adjustable element.

10. A circuit arrangement comprising an inductance, means for setting up a sawtooth current in said inductance, a rectifier connected to rectify voltage pulses set up across said inductance during the short flanks of said sawtooth current to produce a unidirectional voltage, an element associated with said inductance substantially ineffective during the long flanks of said sawtooth current but effective during said short flanks to control the rate of change of current in said inductance, means for effectively varying the value of said element to produce a desired rate of change of current in said inductance during the short flanks, whereby a desired value of said unidirectional voltage is produced, means for controlling the amplitude of said sawtooth current, means responsive to adjustment of said controlling means for simultaneously adjusting the effective value of said element to maintain said rate of change of current and said unidirectional voltage substantially constant, and means for imposing damping on the circuit containing said inductance, said damping means comprising said element.

11. A circuit arrangement comprising a cathode ray tube, an inductance, means for setting up a sawtooth current in said inductance, a rectifier connected to rectify voltage pulses set up across said inductance during the short flanks of said sawtooth current to produce a unidirectional voltage, an element associated with said inductance substantially ineffective during the long flanks of said sawtooth current but effective during said short flanks to control the rate of change of current in said inductance, means for effectively varying the value of said element to produce a desired rate of change of current in said inductance during the short flanks, whereby a desired value of said unidirectional voltage is produced, means for controlling the amplitude of said sawtooth current, means responsive to adjustment of said controlling means for simultaneously adjusting the effective value of said element to maintain said rate of change of current and said unidirectional voltage substantially constant, an electron discharge tube for feeding said sawtooth current to said inductance, a negative feedback path connected to said tube to control said unidirectional voltage, said feedback path including said adjustable element, said cathode ray tube being provided with a permanent magnet focussing lens to assist in focussing the electron beam of said tube, said element being connected to serve as an adjustable beam focussing means.

12. Cathode ray tube apparatus comprising a cathode ray tube, means including an inductance for deflecting the beam of said cathode ray tube, means for driving a sawtooth current through said inductance, means for rectifying voltage pulses set up across said inductance during the short flanks of said sawtooth current to provide a high unidirectional operating voltage for said tube, means for adjusting the amplitude of the long flanks of said sawtooth current, an element associated with said inductance substantially ineffective during the long flanks of said sawtooth current but effective during said short flanks to control the rate of change of current in said inductance, and means coupling said element and said means for varying the amplitude of said long flanks to maintain said unidirectional voltage substantially constant with change in amplitude of said long flanks.

13. Cathode ray tube apparatus comprising means including an inductance for deflecting the beam of said cathode ray tube, an electron discharge tube for driving a sawtooth current through said inductance, means including a variable resistor for adjusting the gain of said tube to vary the amplitude of the long flanks of said sawtooth current, means for rectifying voltage pulses set up across said inductance during the short flanks of said sawtooth current to provide a high unidirectional operating voltage for said tube, and a capacitor connected to said inductance and in series with said variable resistor, said capacitor being substantially ineffective during the long flanks of said sawtooth current but effective during said short flanks to control the rate of change of current in said inductance, the magnitude of said capacitor and said variable resistance being so related that said unidirectional voltage remains substantially constant with change in amplitude of said long flanks.

14. Cathode ray tube apparatus comprising a cathode ray tube, means including an inductance for deflecting the beam of said cathode ray tube, a sawtooth generator tube having its output electrode connected to a source of potential, means for adjusting the magnitude of the potential applied to said output electrode, means coupling said sawtooth generator tube to a driver tube having its output electrode connected to said inductance, for driving a sawtooth current through said inductance, means for rectifying voltage pulses set up across said inductance during the short flanks of said sawtooth current to provide a high unidirectional operating voltage for said tube, and a capacitor connected between the output electrode of said driver tube and the output electrode of said sawtooth generator tube, said capacitor being substantially ineffective during the long flanks of said sawtooth current but effective during said short flanks to control the rate of change of current in said inductance, the magnitude of said capacitor being proportioned to maintain said unidirectional voltage substantially constant with change in amplitude of said long flanks.

15. Cathode ray tube apparatus comprising a cathode ray tube, means including an inductance for deflecting the beam of said cathode ray tube, an electron discharge tube for drivig a sawtooth current through said inductance, means for rectifying voltage pulses set up across said inductance during the short flanks of said sawtooth current to provide a high unidirectional operating voltage for said tube, an inductive impedance in the cathode circuit of said tube substantially ineffective during the long flanks of said sawtooth current but effective during said short flanks to control the rate of change of current in said inductance, and a variable resistor in series with said inductive impedance to adjust the amplitude of the long flanks of said sawtooth current, said inductive impedance being proportioned in relation to said variable resistor to maintain said unidirectional voltage substantially constant with change in amplitude of said long flanks.

16. Cathode ray tube apparatus comprising a cathode ray tube, means including an inductance for deflecting the beam of said cathode ray tube, a driver tube for driving a sawtooth current through said inductance, means for rectifying the voltage pulses set up across said inductance during the short flanks of said sawtooth current to provide a high unidirectional operating voltage for said cathode ray tube, a variable resistor in the cathode circuit of said driver tube for adjusting the amplitude of the long flanks of said sawtooth current, and a capacitor connected in shunt with said variable resistor and substantially ineffective during the long flanks of said sawtooth current but effective during said short flanks to control the rate of change of current in said inductance, the magnitude of said capacitor being proportioned in relation to said variable resistor to maintain said unidirectional voltage substantially constant with change in amplitude of said long flanks.

17. Cathode ray tube apparatus comprising means including an inductance for deflecting the beam of said cathode ray tube, a driver tube for driving a sawtooth current through said inductance, means for rectifying the voltage pulses set up across said inductance during the short flanks of said sawtooth current to provide a high unidirectional operating voltage for said cathode ray tube, a variable resistor in the cathode circuit of said driver tube for adjusting the amplitude of the long flanks of said sawtooth current, and a condenser between the control electrode of said driver tube and its cathode and substantially ineffective during the long flanks of said sawtooth current but effective during said short flanks to control the rate of change of current in said inductance to maintain said unidirectional voltage substantially constant with change in amplitude of said long flanks.

CHARLES LESLIE FAUDELL.

REFERENCES CITED

The following references are of record in the file of this patent:

UNITED STATES PATENTS

| Number | Name | Date |
|---|---|---|
| 2,074,495 | Vance | Mar. 23, 1937 |
| 2,265,620 | Bahring | Dec. 9, 1941 |
| 2,280,990 | White | Apr. 28, 1942 |
| 2,284,378 | Dome | May 26, 1942 |
| 2,397,150 | Lyman | Mar. 26, 1946 |
| 2,414,546 | Nagel | Jan. 21, 1947 |
| 2,438,359 | Clapp | Mar. 23, 1948 |
| 2,440,418 | Tourshou | Apr. 27, 1948 |
| 2,443,030 | Foster | June 8, 1948 |
| 2,498,007 | Schade | Feb. 21, 1950 |
| 2,523,108 | Friend | Sept. 19, 1950 |